(12) United States Patent
Chen et al.

(10) Patent No.: US 11,169,950 B2
(45) Date of Patent: Nov. 9, 2021

(54) METHOD FOR CONTROLLING SERIAL PORT INFORMATION OF SERVER HOST

(71) Applicants: Inventec (Pudong) Technology Corporation, Shanghai (CN); INVENTEC CORPORATION, Taipei (TW)

(72) Inventors: Jin Chen, Shanghai (CN); Yu-Xi Chen, Shanghai (CN); Zhong-Ying Qu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 20 days.

(21) Appl. No.: 16/509,758

(22) Filed: Jul. 12, 2019

(65) Prior Publication Data

US 2020/0387469 A1 Dec. 10, 2020

(30) Foreign Application Priority Data

Jun. 10, 2019 (CN) .......................... 201910497309.9

(51) Int. Cl.
| | |
|---|---|
| *G06F 11/22* | (2006.01) |
| *G06F 13/42* | (2006.01) |
| *G06F 11/36* | (2006.01) |
| *G06F 13/20* | (2006.01) |

(52) U.S. Cl.
CPC ...... *G06F 13/4221* (2013.01); *G06F 11/3636* (2013.01); *G06F 13/20* (2013.01); *G06F 13/4295* (2013.01); *G06F 2213/0002* (2013.01)

(58) Field of Classification Search
None
See application file for complete search history.

(56) References Cited

U.S. PATENT DOCUMENTS

| | | | | |
|---|---|---|---|---|
| 2003/0120977 | A1* | 6/2003 | Tang | G06F 11/2294 714/38.14 |
| 2004/0215850 | A1* | 10/2004 | Azuma | G06F 9/544 710/52 |
| 2005/0039081 | A1* | 2/2005 | Chang | G06F 11/1417 714/36 |
| 2009/0144585 | A1* | 6/2009 | Lu | G06F 11/2284 714/36 |
| 2013/0179671 | A1* | 7/2013 | Tsai | G06F 9/06 713/2 |
| 2013/0301202 | A1* | 11/2013 | Fowler | G06F 13/4027 361/679.21 |
| 2015/0234723 | A1* | 8/2015 | Chuang | G06F 11/2247 713/2 |
| 2017/0344383 | A1* | 11/2017 | Truong | G06F 11/004 |
| 2018/0210526 | A1* | 7/2018 | Lee | G06F 1/263 |
| 2020/0073568 | A1* | 3/2020 | Chaiken | G11C 29/023 |

* cited by examiner

*Primary Examiner* — Hyun Nam
(74) *Attorney, Agent, or Firm* — Locke Lord LLP; Tim Tingkang Xia, Esq.

(57) ABSTRACT

A method for controlling a serial port information of a server host is provided. At first, a basic input/output system of the server host is activated. Then the BIOS reads a first port state value of a first input/output port of a MOS chip. Then an information output state of a serial port of a server host is determined according to the first port state value of the first input/output port, wherein the information output state is related to whether to output information of the serial port.

9 Claims, 4 Drawing Sheets

METHOD FOR CONTROLLING SERIAL PORT INFORMATION OF SERVER HOST

CROSS-REFERENCE TO RELATED APPLICATIONS

This non-provisional application claims priority under 35 U.S.C. § 119(a) on Patent Application No(s). 201910497309.9 filed in China on Jun. 10, 2019, the entire contents of which are hereby incorporated by reference.

BACKGROUND

1. Technical Field

This disclosure relates to a method for controlling an output interface of a server, especially for a method for controlling a serial port switch of a server host.

2. Related Art

Generally speaking, a state of a serial port of a basic input/output system (BIOS) of a server host is preset to an off state, so that the BIOS does not output any serial port information of the server host. A user can enter the BIOS to reset the state of the serial port until the server host is fully turned on. Although the state of the serial port of the BIOS is preset to the off state to reduce an up time of the server host, it has disadvantages as follow. If an error occurs before the server host is fully turned on, the cause of the error cannot be found immediately and a BIOS engineer must re-release a test version of BIOS because the BIOS cannot output the serial port information. When the BIOS engineer tests a dual in-line memory module or a two-wire memory module (DIMM), the serial port information is required to check the signal of DIMM, so the BIOS engineer also needs to re-release the beta BIOS and repeats to do some simple works.

In view of this, there is a need for an improved control method for the serial port switch of the server host in practice, which can at least solve the above disadvantages.

SUMMARY

Accordingly, this disclosure provides a method for controlling an output interface of a server, especially for a method for controlling a serial port switch of a server host.

According to one or more embodiment of this disclosure, a method for controlling a serial port information of a server host comprises: reading a first port state value of a first input/output port of a MOS chip via a basic input/output system(BIOS); determining an information output state of a serial port of a server host according to the first port state value of the first input/output port, wherein the information output state is related to whether to output information of the serial port.

The method for controlling the serial port provided by the present invention has advantages as follow. In addition to ensuring that the server host can boot up quickly, SIV department does not need to wait for a test version of RMT BIOS provided by BIOS department when an error occurs because BIOS can output the serial port information before the server host is fully turned on. Therefore, the BIOS engineer does not need to repeat to do some simple works and reasonably uses time to improve the work efficiency of each department. Moreover, the BIOS engineer can see instructions executed by the BIOS and basic information of most devices on the motherboard through the serial port of the BIOS. In addition, the BIOS engineer can output (for example, print) the serial port information according to a customer's requirement.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
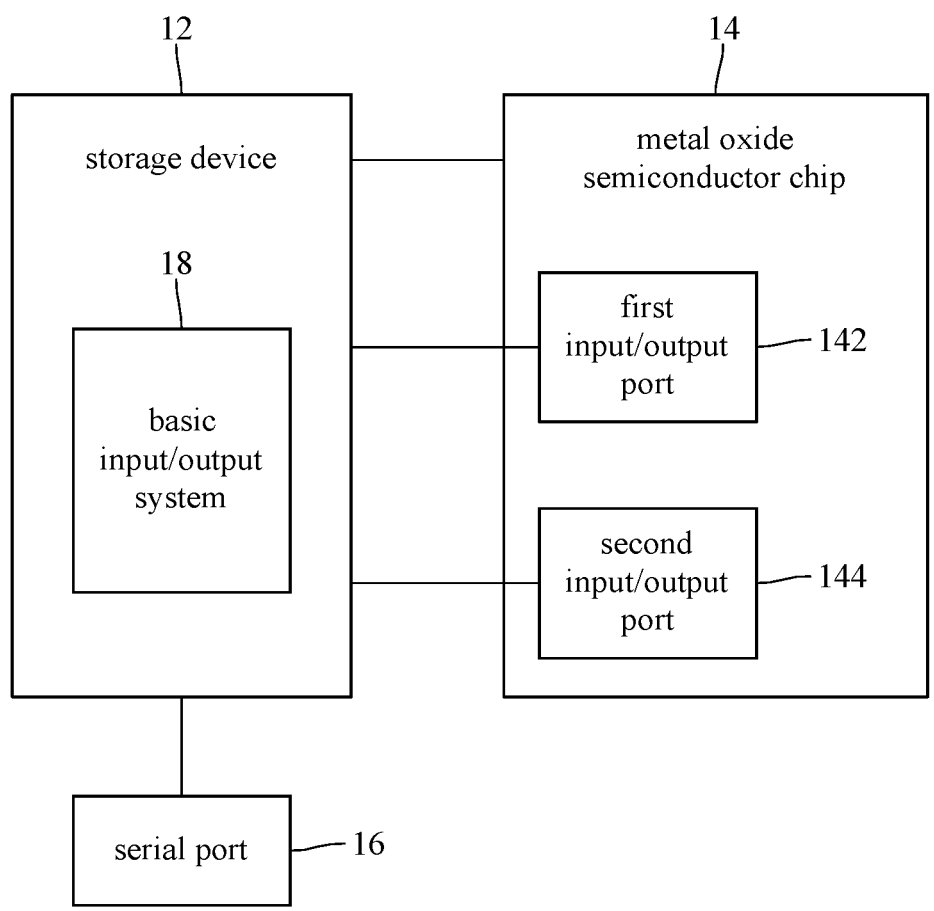
FIG. 1 is a schematic view of a hardware architecture of a server host according to an embodiment of the present disclosure.

FIG. 1 is a schematic view of a hardware architecture of a server host according to an embodiment of the present disclosure. As shown in FIG. 1, the server host 1 includes a storage device 12, a metal oxide semiconductor chip 14, and a serial port 16, and the metal oxide semiconductor (MOS) chip 14 and the serial port 16 are electrically connected to the storage device 12 respectively. The storage device 12 includes, for example, a random access memory, a read only memory, or a hard disk, and the storage device 12 stores a basic input/output system 18. The basic input/output system 18 is used to initialize the hardware of the server host 1 and to activate an operating system of the server host 1. A serial port state value of the basic input/output system 18 can be set as a first value or a second value which is different from the first value. For example, the first and the second values may be 0 and 1 respectively. In one embodiment, when the serial port state value is set as the first value, the serial port 16 of the server host 1 is in an off state and the basic input/output system 18 does not output any information of the serial port 16. When the serial port state value is set as the second value, the serial port 16 of the server host 1 is in an on state and the basic input/output system 18 can output all of the information of the serial port 16 or a part of the information of the serial port 16. The MOS chip 14 is a complementary metal oxide semiconductor (CMOS) chip, and the MOS chip 14 is provided with a first input/output port 142 and a second input/output port 144, an address of the first input/output port 142 is offset 0X60 and the first input/output port 142 and the second input/output port 144 are electrically connected to the storage device 12.

Figure 2:
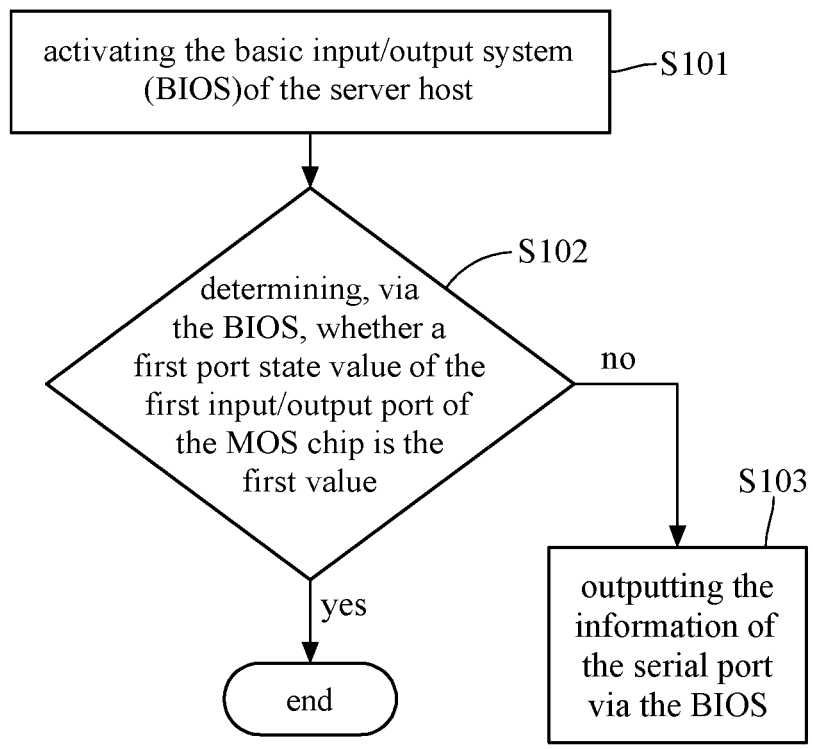
FIG. 2 is a flowchart of a method for controlling a serial port information of a server host according to a first embodiment of the present disclosure.

FIG. 2 is a flowchart of a method for controlling serial port information of a server host according to a first embodiment of the present invention. In conjunction with FIGS. 1 and 2, step S101 is activating the basic input/output system 18 of the server host 1. step S102 is determining, via the basic input/output system 18, whether a first port state value of the first input/output port 142 of the MOS chip 14 is the first value. If the first port state value of the first input/output port 142 is the first value, the first embodiment of the method is ending and the basic input/output system 18 does not output any information of the serial port 16. If the first port state value of the first input/output port 142 is not the first value, step S103 is performed. Step S103 is outputting the information of the serial port 16 via the basic input/output system 18.

Figure 3:
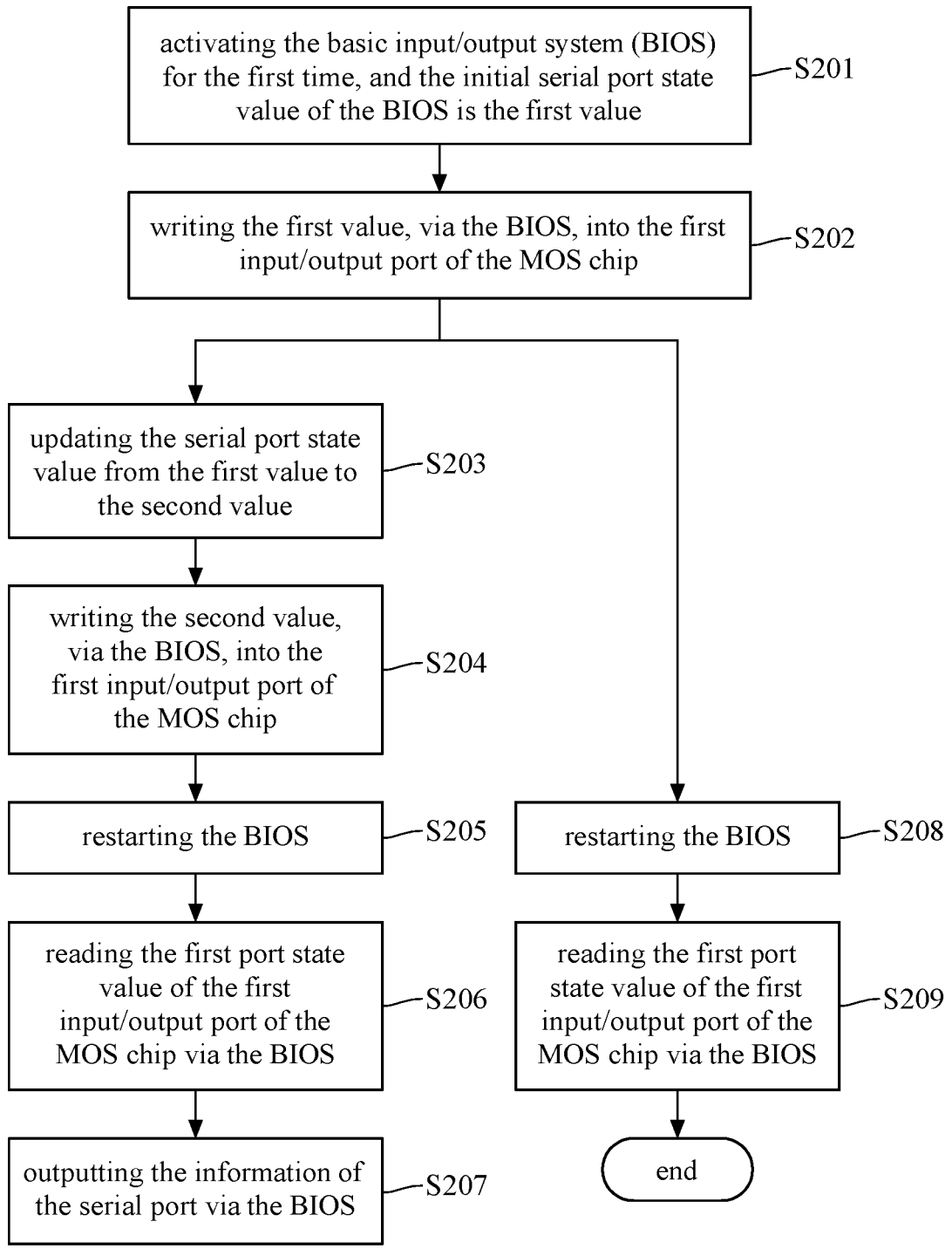
FIG. 3 is a flowchart of a method for controlling a serial port information of a server host according to a second embodiment of the present disclosure.

When an initial serial port state value of the basic input/output system 18 is set as the first value, a method for controlling the serial port information of the server host according to a second embodiment of the present invention is provided. As shown in FIG. 3, step S201 is activating the basic input/output system (BIOS) 18 stored in the storage device 12 of the server host 1 for the first time, and the initial serial port state value of the basic input/output system 18 is the first value. At this time, the basic input/output system 18 does not output any information of the serial port 16. Step S202 is writing the first value, via the basic input/output system 18, into the first input/output port 142 of the MOS chip 14, so that the first port state value of the first input/output port 142 is the first value. After step S202, there are two paths in the second embodiment of the method. One of the two paths is composed of steps s203 to s207 and the other path is composed of steps s208 to s209. Step S203 is updating the serial port state value of the basic input output system 18 from the first value to the second value. At this time, the basic input/output system 18 outputs the information of the serial port 16. Step S204 is writing the second value, via the basic input/output system 18, into the first input/output port 142 of the MOS chip 14, so that the first port state value of the first input/output port 142 is the second value. Step S205 is restarting the basic input output system 18. Step S206 is reading the first port state value of the first input/output port 142 of the MOS wafer 14 via the basic input/output system 18. At this time, the first port state value is the second value. Step S207 is outputting the information of the serial port 16 via the basic input/output system 18.

Step S208 is restarting the basic input output system 18. Step S209 is reading the first port state value of the first input/output port 142 of the MOS chip 14 via the basic input/output system 18, and the first port state value of the first input/output port 142 is the first value at this time at this time. Then the second embodiment of the method is ending and the basic input/output system 18 does not output any information of the serial port 16.

It can be seen that differences between steps S208 to S210 and steps S203 to S207 are whether to update the initial serial port state value before restarting the basic input/output system 18 and whether to write the updated serial port state value to the first input/output port 142 of the MOS chip 14.

After step S207 or step S210, an input interface of the server host 1 receives a control instruction for changing the serial port state value of the basic input/output system 18, thereby changing the first port state value of the first input/output port 142 of the MOS chip 14.

Figure 4:
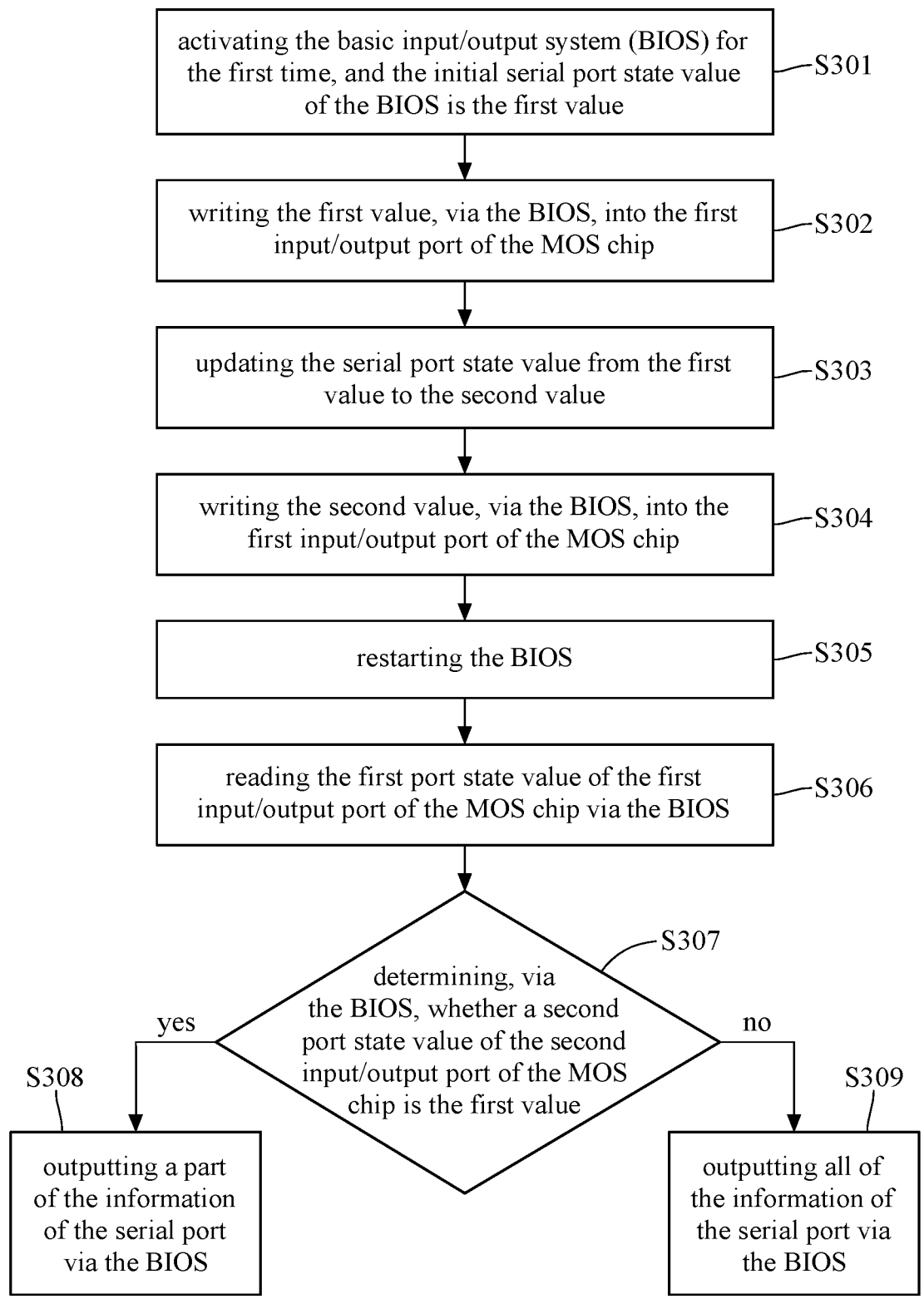
FIG. 4 is a flowchart of a method for controlling a serial port information of a server host according to a third embodiment of the present disclosure.

FIG. 4 is a flowchart of a method for controlling serial port information of a server host according to a third embodiment of the present invention. Comparing FIG. 4 with the FIG. 3, steps S301 to S306 are substantially the same as steps S201 to S206, and the third embodiment further comprises steps S307 to S309. Step S307 is determining, via the basic input/output system 18, whether a second port state value of the second input/output port 144 of the MOS chip 14 is the first value. When the second port state value is the first value, step S308 is performed. When the second port state value is not the first value, step S309 is performed. Step S308 is outputting a part of the information of the serial port 16 via the basic input/output system 18. Step S309 is outputting all of the information of the serial port 16 via the basic input/output system 18.

Between step S301 and step S307, the input interface of the server host 1 receives a control instruction for changing the second port state value of the MOS chip 14, thereby controlling a maximum value of the outputted serial port information and a minimum value of the outputted serial port information.

The method for controlling the serial port provided by the present invention has advantages as follow. In addition to ensuring that the server host can boot up quickly, SIV department does not need to wait for a test version of RMT BIOS provided by BIOS department when an error occurs because BIOS can output the serial port information before the server host is fully turned on. Therefore, the BIOS engineer does not need to repeat to do some simple works and reasonably uses time to improve the work efficiency of each department. Moreover, the BIOS engineer can see instructions executed by the BIOS and basic information of most devices on the motherboard through the serial port of the BIOS. In addition, the BIOS engineer can output (for example, print) the serial port information according to a customer's requirement.

What is claimed is:

1. A method for controlling serial port information of a server host, comprising:
   activating a basic input/output system of the server host;
   reading a first port state value of a first input/output port of a metal oxide semiconductor chip via the basic input/output system;
   determining an information output state of a serial port of the server host according to the first port state value of the first input/output port, wherein the information output state is related to whether to output information of the serial port; and
   writing an updated serial port state value into the first input/output port of the metal oxide semiconductor chip via the basic input/output system when the basic input/output system receives an instruction for updating a serial port state value of the basic input/output system after determining the information output state of the serial port of the server host.

2. The method in claim 1, wherein the basic input/output system does not output the information of the serial port when the first port state value is a first value, and the basic input/output system outputs the information of the serial port when the first port state value is a second value.

3. The method in claim 2, wherein the first value is 0 and the second value is 1.

4. The method in claim 1, wherein an address of the first input/output port of the metal oxide semiconductor chip is offset 0X06.

5. The method in claim 1, wherein the metal oxide semiconductor chip is a complementary metal oxide semiconductor chip.

6. The method in claim 2, further comprising:
reading a second port state value of a second input/output port of the metal oxide semiconductor chip via the basic input/output system when the first port state value is the second value;
outputting a part of the information of the serial port via the basic input/output system when the second port state value is the first value; and
outputting all of the information of the serial port via the basic input/output system when the second port state value is the second value.

7. The method in claim 1, wherein the serial port of the server host is in an off state when the serial port state value is a first value, the serial port of the server host is in an on state when the serial port state value is a second value.

8. The method in claim 1, wherein the basic input/output system does not output the information of the serial port when the updated serial port state value is smaller than the serial port state value which has not been updated.

9. The method in claim 1, wherein the basic input/output system outputs the information of the serial port when an updated serial port state value is bigger than the serial port state value which has not been updated.

\* \* \* \* \*